April 18, 1967 J. E. JONES ETAL 3,314,603

FLUID ENCODER AND ACTUATOR

Filed Nov. 2, 1965 3 Sheets-Sheet 1

INVENTORS.
JOHN E. JONES
JAMES A. MACHMER

BY E. Ronald Coffman
ATTORNEY.

United States Patent Office 3,314,603
Patented Apr. 18, 1967

3,314,603
FLUID ENCODER AND ACTUATOR

John E. Jones and James A. Machmer, Lexington, Ky., assignors to International Business Machines Corporation, New York, N.Y., a corporation of New York Filed Nov. 2, 1965, Ser. No. 506,027
7 Claims. (Cl. 235—201)

This invention provides an inherently versatile and readily manufacturable mechanism for encoding data into a multi-channel "on-off" code. This invention is particularly useful in pneumatic data handling systems.

Data handling systems commonly employ multi-channel "on-off" code representations of data to permit handling by binary or two position operating mechanisms. The particular code form selected may or may not have mathematical significance. For example, alphabetic characters are represented by permutative codes that are arbitrarily chosen, whereas numerals may be represented by a binary code that is mathematically related to the number encoded. Powered typewriters such as that disclosed in U.S. Patent 2,919,002 entitled Selection Mechanism for a Single Element Typewriter, issued Dec. 29, 1959 to L. E. Palmer, having a character matrix, require that data represented by depression of a keylever be converted into a multi-channel (tilt and rotate) code which has mathematical significance in establishing coordinates on the printing matrix for character selection corresponding to the keylever actuated. Where different systems are interconnected, a code translation is often required to render the code of one system compatible with that of another system. The most straightforward form of translation from one parallel channel code to another involves first, complete decoding of an input code to provide an individual active element representative of the entire piece of input data and then, encoding from the individual active element into the output code.

Various encoding mechanisms have been proposed as illustrated by U.S. Patent 3,044,690 entitled Code Converting Mechanism issued July 17, 1962 to J. B. Hickerson, which shows a mechanical encoding mechanism. Also, electrical encoding is now well known in the form of a diode matrix. The practical success and value of any encoding mechanism is directly related to the cost and versatility of the mechanism. Fluid data handling systems at present hold a significant cost advantage over electrical and electronic data handling systems, and due to low inertia considerations hold a speed advantage over mechanical data handling systems. Accordingly, it has been an object of this invention to provide an encoding mechanism that is particularly suitable for use in a fluid data handling system and which maximizes the advantages inherently available to fluid data handling systems.

Another object of this invention has been to provide an encoding mechanism that is completely versatile in the output codes which can be generated, both as to the number of different pieces of data which can be encoded and as to the number of code channels employed and, hence, the amount of information included in the coding.

A further object of this invention has been to provide encoding mechanism capable of generating different coded outputs from a combination input as, for example, sometimes required by a typewriter keyboard wherein complete selection of a character requires selection of a shift status plus an individual character key lever.

This invention employs as a basic element thereof flexible tape actuators as broadly disclosed in U.S. application Ser. No. 421,032 of William F. Voit, Jr., filed Dec. 24, 1964 entitled Monostable Fluid Logic Element and Actuator, and assigned to the assignee of the instant application. Flexible tape actuators of this type have the beneficial property of being actuatable anywhere along their length by a transverse fluid pressure differential which causes flexural deformation and, hence, longitudinal movement thereof. The longitudinal movement is converted into an output signal by direct mechanical connection, or by use of a valve port in the tape itself. When used as a valve, the tape operates as a spool valve type amplifier in that the fluid pressure source control can be many times that of the controlling fluid pressure.

In this invention we provide one elongated flexible tape actuator for each channel of the code into which data is to be converted. The conversion is achieved by providing separate tape actuators at preselected data entry locations spaced along the tapes. All of the actuators at any data entry location are activated upon input to that location, and the tapes having actuators thereat are moved. The data entry locations each have different combinations of actuators to generate unique output codes. It will be seen that any number of actuators can be placed along the length of a group of tapes. It is of particular significance that the outputs generated by the tapes do not reflect in any way the position of the actuators causing the activation, or the member of tapes activated. Specifically, it does not take any longer to cause all tapes to move than to cause only one tape to move since the tapes move the same distance in each instance.

It is sometimes desirable to generate information in addition to basic character selecting information. In typewriters, for example, impression force and spacing requirements may vary with individual characters, thus requiring some additional information to be encoded along with the basic selection of the character. Additional tapes for carrying this data are readily provided and the additional code can be generated either in "on-off" code or other form. For example, if the encoder operated to control a typewriter having three degrees of impression control, as may be required, for example, by printing a period where a light impression is required; printing a small letter "*a*" where medium impression is required; and printing a capital "M" where heavy impression is required; all data for producing the various impressions can be generated by providing actuating cavities of different size and functionally related to the impression control mechanism, whereby a single tape could give three different outputs. An output signal such as this would be useful for controlling the impression control mechanism automatically selecting one of a plurality of cams disclosed in U.S. Patent 3,239,049 of William F. Voit, Jr., filed Sept. 3, 1963 and issued Mar. 8, 1966. On the other hand, if the mechanism for controlling impression, or, for example, for controlling spacing operation on a plural channel "on-off" code, additional tapes for each channel are provided in the encoder and operation then follows that of the basic encoding mechanism.

Typewriters and typewriter-like mechanisms having an operator oriented keyboard ordinarily employ between 40 and 50 keybuttons which are readily actuatable from the operator's hands. It is usually necessary, however, to have the keyboard generate between 60 and 90 different outputs as required, for example, to produce both upper and lower case characters, numerals, symbols, etc., and for this purpose a shift mechanism is ordinarily employed. In the conventional typewriter it has been convenient to encode upper and lower case characters corresponding to a single key lever identically for control purposes, and to distinguish the codes by the current shift status of the machine. This procedure is formalized into the common Boudot teletypewriter code wherein each available print character is identified by a base code that is preceded by a shift code. The base codes for characters generated by the same key are the same. This invention readily permits generation of completely independent codes from a single key lever by providing alternate tape actuators which are selectively driven according to case shift. A keyboard so constructed is thus compatible with a printing mechanism designed to operate on a computer code having no shift coding.

These and other objects, features and advantages of our invention will be apparent from the following description of the preferred embodiments of our invention wherein reference is made to the accompanying drawings of which:

Figure 1:
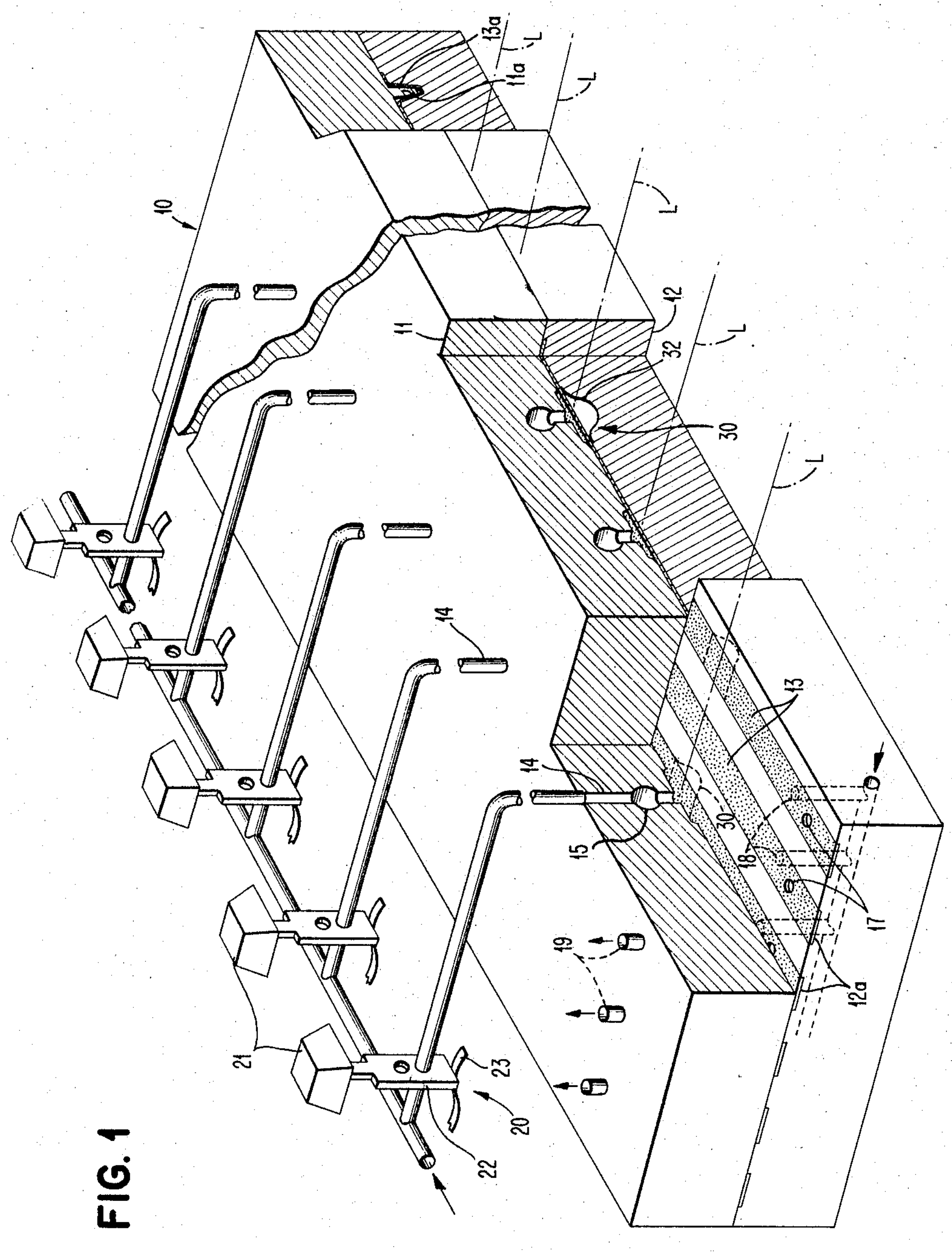
FIG. 1 is a partially cut-away perspective view of an encoder constructed in accordance with our invention and adapted to receive input control from a keyboard.

Referring now more specifically to FIGURE 1, there is shown an encoder 10 formed conveniently in upper and lower halves 11 and 12 made of any suitable, easily formable material. A plurality of thin, elongated, flexible strips or tapes 13, like those disclosed in the aforesaid U.S. patent application Ser. No. 421,032, are supported in parallel or mutual longitudinally coextensive individual channels 12*a* between the encoder halves 11 and 12 for sliding movement along the principal part of their length. One end 13*a* of each of the tapes 13 is held (as by a pin 11*a*) against sliding movement.

A plurality of data entry locations L are spaced along the length of the encoder 10. An input conduit 14 is provided at each data location L and connects with a fluid flow manifold 15 that extends laterally across the tapes 13 at the location L. The conduits 14 connect the manifolds 15 with a data entry source 20 such as a keyboard for operational control. The keyboard has a plurality of keybuttons 21 that each control individual slide valves 22. Spring 23 normally holds the valves 22 closed. Depression of a keybutton 21 opens its valve 22 to pressurize the associated conduit 14.

A plurality of selectively activatable individual tape actuators 30 are provided at preselected ones of the data entry locations L along each of the tapes 13. The actuators operate to flex a tape 13 by a predetermined amount and thereby move the free end thereof.

Figures 2A, 2B, 2C, 2D:
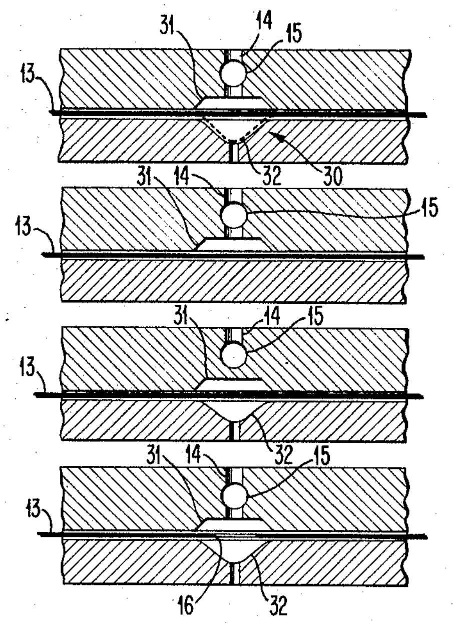
FIG. 2 is a composite illustration of several alternative actuator constructions.

Referring now more particularly to FIGURE 2*a*, the actuators 30 each comprise a pressure supply part or access chamber 31 and an opposed vented cavity or depression 32 which cooperate with opposed sides of the tape 13 to create a pressure differential thereacross to drive the tape 13 into the cavity 32. The cavity 32 is constructed of a specified depth or extent to meter or limit the amount of tape forced thereinto.

Output encoding takes the form of different combinations of actuated and unactuated tapes as controlled by the preselection of combinations of complete actuators 30 at the data entry locations L. The absence of a complete actuator 30 can be selectively provided by any of several means, three of which are shown in FIGURES 2*b*, 2*c* and 2*d*. In FIGURE 2*b* the metering cavity 32 has been omitted, thereby eliminating the possibility of actuating the tape 13 in response to a pressure in the manifold 15. Note that the supply port 31 and manifold 15 can be functionally combined if this approach is taken. In FIGURE 2*c*, the actuator supply port 31 is not connected to a manifold 15 and, accordingly the tape 13 cannot be actuated by any pressure supplied to the manifold 15 at the corresponding data entry location L. In FIGURE 2*d* there is no complete means to develop a pressure differential across the tape 13 due to the presence of a large perforation or hole 16 therein. From the foregoing, it will be understood that coded actuation of the tapes 13 is preselected by the presence or absence of a complete tape actuator at the various tapes at different data entry locations.

The tapes 13 can generate coded output signals in several forms, i.e., mechanical, electrical, pneumatic, etc., simply by providing a transducer that is responsive to predetermined tape movement. In the embodiment shown in FIGURE 1, the tapes 13 are each provided with an output valve opening 17 which normally is offset from an associated air supply port 18 and signal output conduit 19. Flexural actuation of any tape 13 places its port 17 in alignment with the conduits 18 and 19, to complete a pneumatic path and thereby generate a pneumatic output signal.

The operation of the device thus described is as follows: Normally, the tapes 13 are in their position as shown wherein no tape is depressed into any actuating cavity 32 since no supply exists to any conduit 14 and the resiliency of the tapes 13 is such to resist flexural deformation in the absence of an applied actuating force. One of the keybuttons 21 is depressed indicating, for example, an alphabetic character to be encoded. Immediately, the associated conduit 14 is pressurized and all tape actuators 30 at the associated data entry location L are activated, moving their associated tape valve openings 17 into alignment with the conduits 18 and 19. Those tapes 13 not having actuators at the selected data entry location L are not flexed or moved. The conduits 19 at this instant contain a multibit "on-off" parallel coded representation of the alphabetic character represented by the depressed key. This coded representation can be used in any manner desired, for example, as an input to the serializer disclosed in copending U.S. Patent application Ser. No. 468,217 entitled Pneumatically Samples Serializer, filed June 30, 1965, by James A. Machmer, and assigned to the assignee of the instant application.

Figure 3:
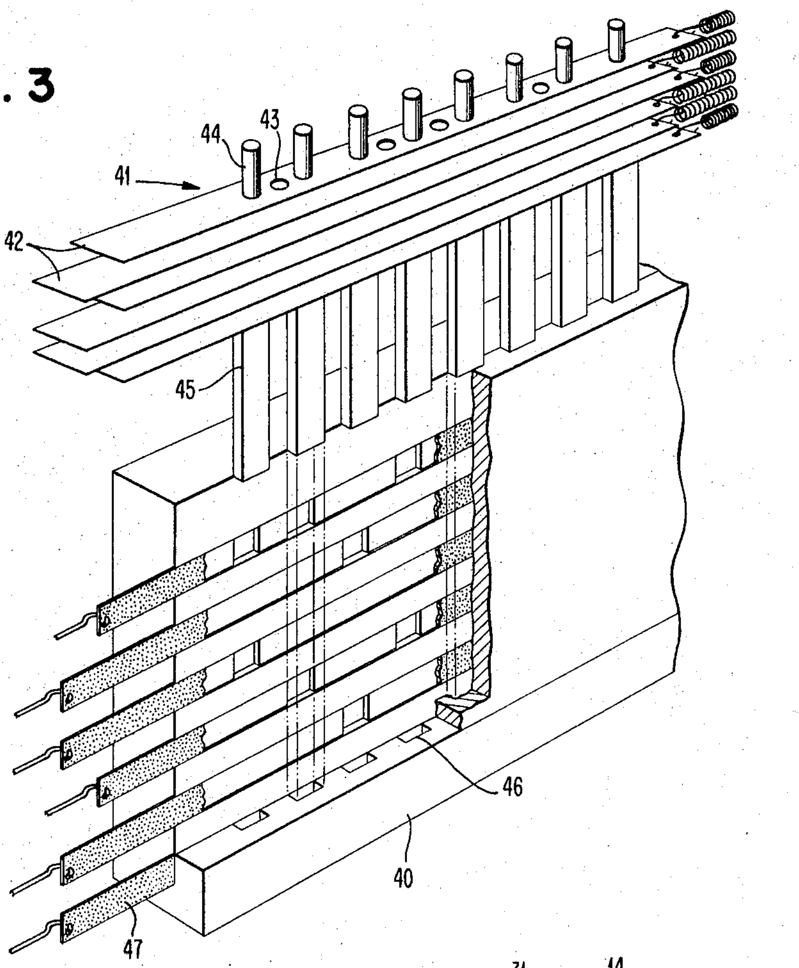
FIG. 3 is a perspective view of an encoder constructed in accordance with our invention as adapted to receive data input from a code translator.

It will be appreciated that the input to the encoder 10 and the output therefrom form no part of this invention, other than to illustrate the breadth and versatility of the encoder itself. FIGURE 3 illustrates a different form of input and output mechanisms that may be used with an encoder 40 that is similar to the encoder 10 disclosed in FIGURE 1. In FIGURE 3 there is shown a code translator having a decoder 41 that is comprised of a plurality of perforated strips or slides 42, each movable in response to a channel of a multi-channel input code as might be read from punched paper tape. A similar decoder is also disclosed in the aforesaid U.S. application Ser. No. 421,032. The slides 42 have code perforations 43 therein, judiciously chosen whereby each combination of positions of the slides 42 will select a flow path from one of a plurality of input conduits 44 to a single discrete output conduit 45. The output conduits 45 correspond in function to the supply conduits 14 of the embodiment shown in FIGURE 1 and communicate with manifolds 46 in the encoder 40 to actuate selected tapes 47 thereof as described in connection with FIGURE 1. The tapes 47 have mechanical output means which may, for example, operate character selection latches on a typewriter like that disclosed in U.S. Patent 2,919,002, mentioned above.

Figure 4:
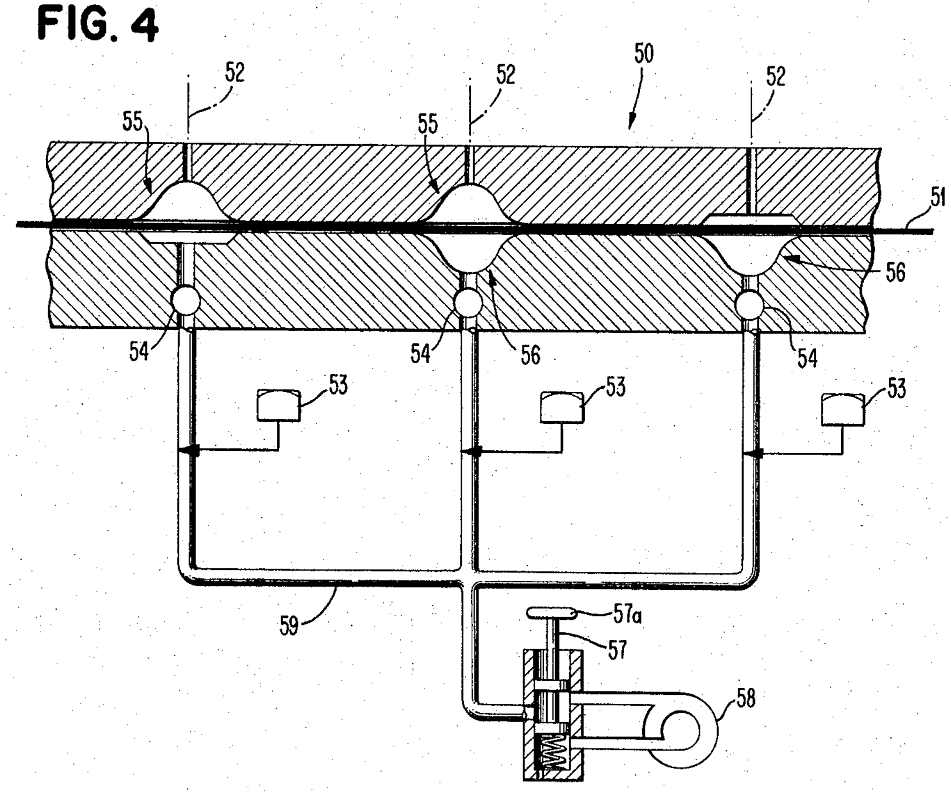
FIG. 4 is a schematic layout view of a modified form of our invention.
Figure 5:
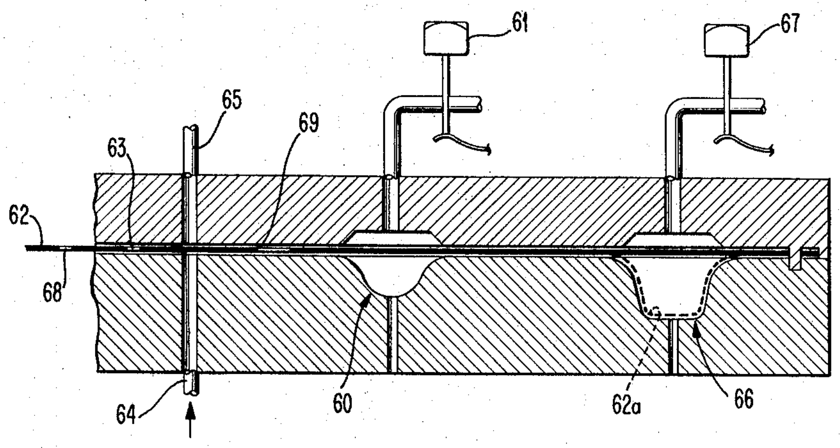
FIG. 5 is a second schematic layout view of a further modified form of our invention.

FIGURES 4 and 5 illustrate a second degree of versatility of our invention wherein the variable encoding is provided in accordance with a selected mode or operating state. It may be desirable, for example, to employ a code set wherein all codes represent discrete characters, such as upper and lower case letters, numerals, and figures, having 90 or more characters, while retaining a relatively small number of key buttons for operator convenience. A keyboard constructed for this purpose using different technology is disclosed in U.S. Patent 3,302,764 issued Feb. 7, 1967, entitled Keyboard Encoder with Plural and Different Sets of Code Members by J. E. Hickerson, and assigned to the assignee of the instant application.

In FIGURE 4 there is shown in schematic elevation a portion of an encoder 50 having a tape 51 therein that passes through data entry locations 52. Data input is provided by keybutton valves 53 which complete a flow path with their associated manifolds 54 when depressed. The locations 52 may have a positive pressure actuator 55, a negative pressure actuator 56, or any combination including none, all as preselected in accordance with a desired output code. The actuators 55 and 56 are both structurally and functionally similar to the actuators described in connection with FIGURE 1, with the exception of the pressure differential direction. The tape 51 will or will not be actuated, depending upon whether an actuator 55 or 56 exists at the location 52 and whether the actuator is selected. Selective actuation of the actuators 55 and 56 is controlled by a valve 57 which is operated by a shift key **57*a* to supply either positive or negative pressure from an air pump 58 to the keybutton valves 53 through conduit 59. When the shift key 57*a* is in the position shown, positive pressure is supplied to the conduit 59, and selection of a keybutton valve 53 will actuate the tape 51 upwardly only if an actuator 55 is provided at the associated data entry location 52. On the other hand, when the shift key 57*a* is depressed and the pump 58 supplies negative pressure to the conduit 59, depression of a key 53 will flex the tape 51 only if an actuator 56 is provided at the selected data entry location. Accordingly, it will be seen that each data entry location can be encoded with two completely independent codes selectable by positive or negative pressure as controlled by the shift key 57*a***.

A second form of independent coding is shown in FIGURE 5 in which a typical actuator 60 is shown under the control of a key 61 as explained in connection with FIGURE 1 to flex a tape 62. Output from the tape 62 is provided by valving port 63 which will align with supply conduit 64 and signal conduit 65 if the tape 62 is activated. In the position shown, selection of key 61 will cause actuation of the tape 62 since the actuator 60 is complete. Accordingly, a flowpath will be completed between supply and the signal conduits 64 and 65, respectively, by port 63. The code generated is varied by a shift actuator 66 that operates under the control of a shift key 67 to actuate or flexurally deform a length **62*a* of the tape greater than a normal amount. In the shifted position, the actuator 60 and conduits 64 and 65 cooperate with a different portion of the tape 62. A second valving port 68 occupies the position normally occupied by valving port 63. The actuator 60** may now be incomplete, if desired, as described in FIGURE 2*d* by providing a perforation or hole 69 to move into alignment therewith. Selection of key 61 with the tape 62 shifted will not actuate the tape 62 and the valving port 68 will not complete a pneumatic circuit between the conduits 64 and 65. A different output is thus generated. It will be seen that the mechanism constructed in accordance with FIGURE 5 can have varied encoding of key represented data, depending upon the provision of one or more shift states and preselected holes 69 to permit and prevent actuation under certain conditions.

Those skilled in the art will appreciate that we have provided a particularly simple, but versatile encoder for converting fluid signals into a parallel multichannel code. While certain specific embodiments have been disclosed for purposes of illustration, and certain particular uses and potential employments of our invention have been described, it is to be understood that modifications and additions can be made without departing from the spirit and scope of our invention as defined and limited only by the appended claims.

We claim:

1. An encoder comprising:
a plurality of elongated flexible tapes,
means slidably supporting said tapes in a mutual longitudinally coextensive relationship,
a plurality of data entry locations spaced along the length of said tapes, each of said tapes having selectively activatable actuators positioned along its length at preselected data entry locations for causing flexing thereof by a predetermined amount when active,
data input means for activating all actuators at a single data entry location cooperatively together, and
code output means operatively associated with each of said tapes for generating one of two possible output signals in response to flexure or nonflexure of its associated tape by said predetermined amount.

2. An encoder as defined in claim 1 wherein each of said actuators comprises:
means for creating a pressure differential across its associated tape, and
means for limiting flexure of said tape in response to said pressure differential to said predetermined amount.

3. An encoder as defined in claim 2 wherein the data input means comprises a fluid flow manifold at each data entry location that communicates with all pressure differential creating means at its respective data entry location.

4. An encoder as defined in claim 1 wherein said data input means includes a keyboard connected to said actuators for control thereof in response to key depression.

5. An encoder as defined in claim 3 wherein said data input means further comprises a decoder responsive to a multi-channel input code for generating a fluid pulse in one of a plurality of individual flow conduits in response to corresponding input codes, and means connecting said individual flow conduits to said manifolds.

6. An encoder as defined in claim 2 wherein at least one further selectively activatable actuator is placed along the length of at least one of said tapes at preselected data entry locations, said further actuators each comprising:
means for flexing its associated tapes in response to a pressure differential opposed in polarity to that which operates the first said actuators, and
means for limiting flexure of said tape in response to said opposed pressure differential to said predetermined amount.

7. An encoder as defined in claim 1 further comprising shift status means cooperable with said tapes and with said data input means and operable in either of at least two different operating states whereby operation of at least some of said data input means produces a different output signal from said tapes in each of said shift status operating states.

References Cited by the Examiner

UNITED STATES PATENTS

| | | | |
|---|---|---|---|
| 2,666,516 | 1/1954 | Boni | 197—11 |
| 3,156,157 | 11/1964 | Smith et al. | 91—48 |
| 3,263,922 | 8/1966 | Voit | 235—201 |

RICHARD B. WILKINSON, *Primary Examiner.*

L. R. FRANKLIN, *Assistant Examiner.*